US012586136B2

(12) United States Patent
Young et al.

(10) Patent No.: US 12,586,136 B2
(45) **Date of Patent: *Mar. 24, 2026**

(54) ACCELERATED INTELLIGENT ENTERPRISE INCLUDING TIMELY VENDOR SPEND ANALYTICS

(71) Applicant: CXO Nexus, New York, NY (US)

(72) Inventors: Barrington Young, Austin, TX (US); Bhanupratap Chandrawat, Ratlam (m.P.) Pin (IN); Vincent Totoro, Katonah, NY (US); Steve Benfield, Sandy Springs, GA (US); Sebastien Masclet, Santa Barbara, CA (US)

(73) Assignee: CXO Nexus, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/762,517

(22) Filed: Jul. 2, 2024

(65) Prior Publication Data

US 2024/0354867 A1     Oct. 24, 2024

Related U.S. Application Data

(63) Continuation of application No. 17/198,203, filed on Mar. 10, 2021, now Pat. No. 12,026,787.

(60) Provisional application No. 62/987,623, filed on Mar. 10, 2020.

(51) Int. Cl.
| | |
|---|---|
| *G06Q 40/12* | (2023.01) |
| *G06N 5/048* | (2023.01) |
| *G06N 20/10* | (2019.01) |

(52) U.S. Cl.
CPC ............. *G06Q 40/12* (2013.12); *G06N 5/048* (2013.01); *G06N 20/10* (2019.01)

(58) Field of Classification Search
None
See application file for complete search history.

(56) References Cited

U.S. PATENT DOCUMENTS

| | | | | |
|---|---|---|---|---|
| 5,358,278 A | * | 10/1994 | Ellis ................... | B42D 15/0053 |
| | | | | 281/31 |
| 7,398,234 B1 | | 7/2008 | Theis et al. | |
| 8,255,278 B1 | * | 8/2012 | Young .................. | G06Q 20/322 |
| | | | | 705/17 |
| 8,438,091 B1 | * | 5/2013 | Berman ................. | G06Q 40/00 |
| | | | | 705/40 |

(Continued)

FOREIGN PATENT DOCUMENTS

| | | |
|---|---|---|
| JP | 2019109661 A | 7/2019 |
| JP | 2019194930 A | 11/2019 |

OTHER PUBLICATIONS

EP Office Action Nov. 14, 2023; Application 21767194.0; Applicant CXO Nexus.

(Continued)

*Primary Examiner* — Fateh M Obaid
(74) *Attorney, Agent, or Firm* — VOLPE KOENIG

(57) ABSTRACT

An intelligent enterprise system and method is disclosed. The system and method include an input/output (IO) interface configured to receive information related to accounting information, a processor interconnected with a memory configured to store received information from the IO interface, and analyze the information to provide timely vendor spend analytics, and a display device configured to display the provided timely vendor spend analytics.

20 Claims, 16 Drawing Sheets

(56) References Cited

U.S. PATENT DOCUMENTS

| | | | | |
|---|---|---|---|---|
| 8,732,219 | B1 * | 5/2014 | Ferries | G06F 16/56 707/723 |
| 10,169,353 | B1 * | 1/2019 | Riley | G06F 16/148 |
| 10,607,141 | B2 * | 3/2020 | Jerram | G06N 5/02 |
| 11,205,147 | B1 | 12/2021 | Anderson et al. | |
| 2005/0015261 | A1 * | 1/2005 | Reardon | G06Q 10/10 705/7.29 |
| 2005/0055275 | A1 | 3/2005 | Newman et al. | |
| 2009/0182654 | A1 | 7/2009 | Mullen et al. | |
| 2009/0222364 | A1 | 9/2009 | McGlynn et al. | |
| 2009/0254971 | A1 * | 10/2009 | Herz | G06Q 30/02 726/1 |
| 2010/0106680 | A1 * | 4/2010 | Navarrete | G06Q 10/06 707/600 |
| 2011/0320397 | A1 * | 12/2011 | Podkolzin | G06N 5/022 706/48 |
| 2013/0073464 | A1 * | 3/2013 | Magpayo | G06Q 30/0256 705/44 |
| 2015/0039388 | A1 * | 2/2015 | Rajaraman | G06Q 30/0613 705/7.29 |
| 2015/0121180 | A1 * | 4/2015 | Benfield | G06F 40/166 715/202 |
| 2015/0121232 | A1 * | 4/2015 | Edwardson | G06F 40/106 715/732 |
| 2015/0142713 | A1 * | 5/2015 | Gopinathan | G06Q 40/00 706/14 |
| 2015/0221045 | A1 | 8/2015 | Heckler et al. | |
| 2015/0332308 | A1 * | 11/2015 | Liu | G06Q 30/0242 705/14.41 |
| 2017/0011445 | A1 * | 1/2017 | Reinsberg | G06Q 30/0627 |
| 2017/0161465 | A1 * | 6/2017 | Arora | G16H 50/80 |
| 2018/0144314 | A1 * | 5/2018 | Miller | G06Q 20/14 |
| 2018/0350006 | A1 * | 12/2018 | Agrawal | G06F 7/026 |
| 2019/0012733 | A1 | 1/2019 | Gorman et al. | |
| 2019/0325211 | A1 | 10/2019 | Ordonez et al. | |
| 2020/0027172 | A1 * | 1/2020 | Benfield | H05K 999/99 |
| 2020/0111173 | A1 * | 4/2020 | Benfield | G06F 16/4393 |
| 2020/0322800 | A1 * | 10/2020 | Ozanian | G06N 3/045 |
| 2021/0192412 | A1 | 6/2021 | Krishnaswamy | |

OTHER PUBLICATIONS

International Search Report and Written Opinion is related PCT/ 2021/021789, mailed May 25, 2021.

JP Office Action, Oct. 6, 2024, Application No. 2022-555130; Applicant CXO Nexus.

Otsuki, "The measure for Yoshihisa and the accounts business to diversify," Fujitsu, vol. 62, No. 2, Mar. 10, 2011, pp. 188-192.

* cited by examiner

Models Overview

500

600

610
620
630
640

ACCELERATED INTELLIGENT ENTERPRISE INCLUDING TIMELY VENDOR SPEND ANALYTICS

CROSS REFERENCE TO RELATED APPLICATION

This application is a continuation of U.S. Non-Provisional application Ser. No. 17/198,203 filed Mar. 10, 2021 issuing Jul. 2, 2024 as U.S. Pat. No. 12,026,787 which claims benefit of U.S. Patent application No. 62/987,623 entitled ACCELERATED INTELLIGENT ENTERPRISE INCLUDING TIMELY VENDOR SPEND ANALYTICS filed Mar. 10, 2020, all of which are incorporated by reference as if fully set forth.

FIELD OF INVENTION

The present invention is directed to an enterprise system, and more specifically to an intelligent enterprise system including timely vendor spend analytics.

SUMMARY OF THE INVENTION

An intelligent enterprise system and method is disclosed. The system and method include an input/output (IO) interface configured to receive information related to accounting information, a processor interconnected with a memory configured to store received information from the IO interface, and analyze the information to provide timely vendor spend analytics, and a display device configured to display the provided timely vendor spend analytics.

The system and method may include received information that includes spending by category. The system and method may include received information that includes spending by vendor. The system and method may include received information that includes spending over a time period, such as a selected fiscal year.

The system and method may include received information that is processed by the processor using nearest neighbors propensity scoring to find exact matches. The system and method may include received information that is processed by the processor using fuzzy matching algorithm to identify matches. The system and method may include received information that is processed by the processor using at least two fuzzy matching algorithms to identify matches. The system and method may include matching based on a cutoff score. The system and method may include the parent company information being identified for at least one vendor.

The system and method may include a textual tokenization is performed. The system and method may include learning the OEM based on the received information. The system and method may include determining the taxonomy category based on the received information.

The system and method may include at least one of a hybrid model combining a Support Vector Machine (SVM), a Random Forest (RF), a neural network (NN), and an expert system (ES) is utilized.

The system and method may include where the display device is configured to select vendor true spend, peer comparison, market insight and prescriptive insight aspects.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

The present invention is directed to an intelligent enterprise with vendor spend analytics. The present invention may accelerate the intelligence of the enterprise using artificial intelligence of the analytics. In a timely manner, the present enterprise provides transparent and prescriptive insights. This allows users to make increasingly smarter and faster decisions with less risk given the enterprise collaboration and use of prescriptive intel. The present enterprise may be used with in-place financial and vendor management solutions. The present enterprise utilizes an agnostic overlay that is a SaaS application that works with all financial systems to categorize and visualize vendor spend.

When referred to hereafter, the term "processor" includes but is not limited to a single- or multi-core general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine. When referred to hereafter, the term "computer-readable storage medium" includes but is not limited to a register, a cache memory, a read-only memory (ROM), a semiconductor memory device such as a Dynamic Random Access Memory (D-RAM), Static RAM (S-RAM), or other RAM, a magnetic medium such as a flash memory, a hard disk, a magneto-optical medium, an optical medium such as a CD-ROM, a digital versatile disk (DVDs), or Blu-Ray disc (BD), other volatile or non-volatile memory, or other type of device for electronic data storage. When referred to hereafter, the term "memory device" is a device configurable to read and/or write data to/from one or more computer-readable storage media.

When referred to hereafter, the term "display device" includes but is not limited to a monitor or television display, a plasma display, a liquid crystal display (LCD), or a display based on technologies such as front or rear projection, light emitting diodes (LEDs), organic light-emitting diodes (OLEDs), or Digital Light Processing (DLP). When referred to hereafter, the term "input device" includes but is not limited to a keyboard, a mouse, a trackball, a scanner, a touch screen, a touch pad, a stylus pad, and/or other device that generates electronic signals based on interactions with a human user. Input devices may operate using technologies such as Bluetooth, Universal Serial Bus (USB), PS/2, or other technologies for data transmission.

Figure 1:
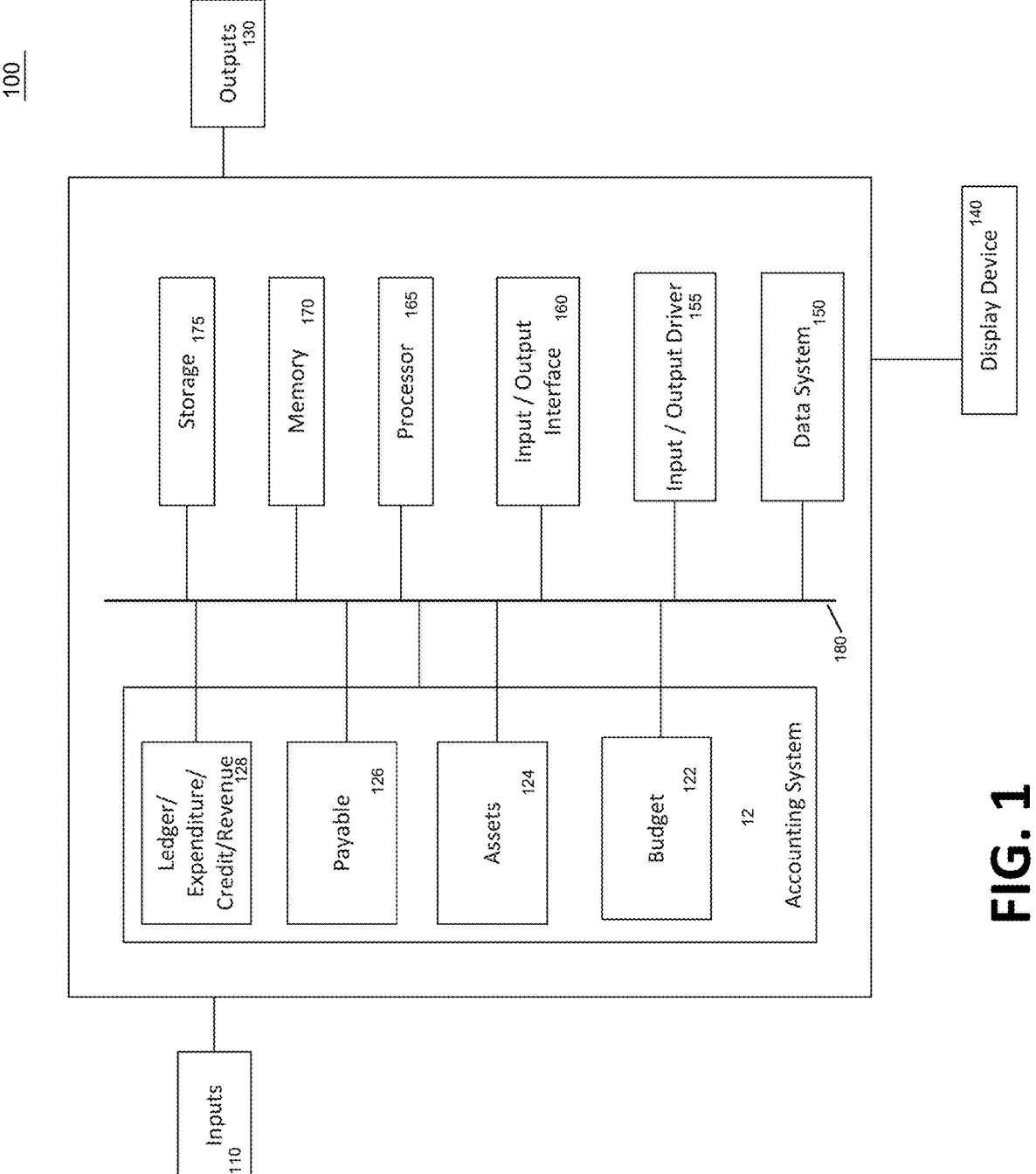
FIG. 1 illustrates an example computing system for determining the vendor spend analytics.

FIG. 1 shows an example computing system 100 for determining the vendor spend analytics. The vendor spend analytics of a service provider indicates the service provider performance in a matter that is easily compared both to ideal performance standards and to performance of other service providers of the same business or organization. As described in further detail below, the vendor spend analytics is a weighted sum based on the performance criterion values and a plurality of weighting factors. Vendor spend analytics may be calculated by combining information regarding spend data from the financial systems of a business to business related metadata. For example, vendor metadata such as risk score, diversity ratings, and other data fields may be utilized to contextualize spend data. By collecting these data points across multiple companies, peer comparison may be provided for the information collected.

The example computing system 100 includes a processor 165, a memory device 170, and a communications bus 180 for communications of data between components. Computing system 100 optionally includes a number of components, including graphics subsystem (not shown), network interface (not shown), input interface 160, and printer driver (not shown). Graphics subsystem may provide data to and/or drive display device 140. Network interface provides a wired or wireless network connection over which the computing system 100 may connect to networked printer or to the Internet. Input interface 160 may be, for example, a wireless connection or data port capable of receiving data from one or more input devices. Printer driver provides data to and/or drives local printer.

Computing system 100 includes a subsystem for evaluating service provider performance data, determining the vendor spend analytics based on the performance data, generating graphical output data to display results, and analyzing the vendor spend analytics and related data. The subsystem includes performance data module, aggregation module, quantifying module, vendor spend analytics module, display module, and results analysis module. The modules may be implemented as software modules, specific-purpose processor elements, or as combinations thereof.

Suitable software modules include, by way of example, an executable program, a function, a method call, a procedure, a routine or sub-routine, a set of processor-executable instructions, a script or macro, an object, or a data structure. Some or all of the modules may be implemented as, by way of further example, modules or sub-routines within a spreadsheet program such as Microsoft Excel®, a database program, or other type of program. Data used by and/or generated by the modules may be stored in memory device 170. The processor 165 is configurable to operate and control the operation of the modules and to control communications between the modules and other components of computing system 100 such as the printer driver, graphics subsystem, memory device 170, network interface, and input interface 160.

Generally, an accounting system 120 is used to summarize, analyze, and report the financial activity of a company. Accounting system 120 may include a ledger, expenditure, credit, revenue system 128, payable system 126, assets 124, and budget 122 as will be described. This accounting system 100 via the ledger, expenditure, credit, revenue system 128, payable system 126, assets 124, and budget 122, etc., information determines the vendor spend analytics. The information in the accounting system 100 includes data sourced from Requisition System, Purchase Order, Accounts Payable, Invoice Detail, General Ledger Chart of Accounts and Business Hierarchies. Data from these sources is cross referenced by the present system 100 to clean, categorize and enrich data.

Generally, the ledger of the ledger, expenditure, credit, revenue system 128 may comprise a general ledger. The general ledger represents the record-keeping system for a company's financial data with debit and credit account records validated by a trial balance. The general ledger provides a record of each financial transaction that takes place during the life of an operating company. The general ledger holds account information that is needed to prepare the company's financial statements, and transaction data is segregated by type into accounts for assets, liabilities, owners' equity, revenues, and expenses.

Expenditure of the ledger, expenditure, credit, revenue system 128 is a recordation within the ledger representing a payment or the incurrence of a liability in exchange for goods or services. Evidence of the documentation triggered by an expenditure is a sales receipt or an invoice.

Credit and debits are entries made in account ledgers to record changes in value resulting from business transactions. A debit entry in an account represents a transfer of value to that account, and a credit entry represents a transfer from the account. For example, a tenant who pays rent to a landlord may make a debit entry in a rent expense account associated with the landlord, and the landlord may make a credit entry in a receivable account associated with the tenant. Every transaction produces both debit entries and credit entries for each party involved, where each party's total debits and total credits for the same transaction are equal.

Revenue of the ledger, expenditure, credit, revenue system 128 is the income that a business has from its normal business activities, usually from the sale of goods and services to customers. Revenue is also referred to as sales or turnover.

Payable or accounts payable (AP) 126 is an account within the general ledger that represents a company's obligation to pay off a short-term debt to its creditors or suppliers. AP 126 includes the accounting for making payments owed by the company to suppliers and other creditors. AP 126 are amounts due to vendors or suppliers for goods or services received that have not yet been paid for. The sum of all outstanding amounts owed to vendors is shown as the accounts payable balance on the company's balance sheet.

Assets 124 are any resource owned by the business. Anything tangible or intangible that can be owned or controlled to produce value and that is held by a company to produce positive economic value is an asset. Simply stated, assets represent value of ownership that can be converted into cash.

Budget 122 represents a financial plan that includes both financial and non-financial information. Its most obvious features are a projection of revenue, amounts of selling to certain entities, and expenses. The budget can also contain non-financial information, such as how many employees you think you need. A budget 122 is a forecasting document, but businesses use it as a financial control tool, as well. A financial control is a tool to monitor activities in your business.

Vendor spend analytics module may be included within the data system 150 and/or the accounting system 120. Vendor spend analytics may determine the vendor spend analytics by determining a weighting factor for each quantitative performance value, multiplying each quantitative performance value by the corresponding weighting factor, and summing the products of the multiplied quantitative performance values and weighting factors. The weighting factors may be based on user input received via input interface. Weighting factors may be adjusted to focus the vendor spend analytics on aspects of performance criteria that a user has determined to be the most important and/or to de-emphasize criteria that a user has determined to be less important. In an example use case, a user may set performance factors to indicate that a particular performance criterion is very important. At a subsequent point in time, the user may adjust the weighting factors to reflect that other performance criteria have become of greater importance.

Display module may receive the data generated by the quantifying module and vendor spend analytics module and generate data for the display of the received data. The display data may be communicated by the display module to the printer driver and to the printer, and the printer may produce a printed version of the display data. The display data may be communicated to graphics subsystem by display module to display device 140, and display device 140 may render the display data to a user. An example visual depiction of the display data that may be generated by display module and printed by printer or rendered by display device 140 is described in detail below.

The display data generated by display module may take various forms according to various implementations of display module and computing system 100. For example, the generated display may represent the contents of an image, one or more pages in a document, or other visual artifact. The generated display data may be compressed or uncompressed image data according to a format such as Joint Photographic Experts Group (JPEG), Tagged Image File Format (TIFF), Scalable Vector Graphics (SVG), bitmap, or other format. The generated display data may be data or instructions interpretable by a window manager, desktop manager, graphical user interface, printer driver, graphics driver, word processor, document viewing or editing program, or other software or hardware component related to the implementation of a user interface and/or graphics.

Results analysis module may receive the data generated by the vendor spend analytics module and determine whether parameters used by the accounting system 120, and vendor spend analytics module should be changed. For example, results analysis module may compare vendor spend analytics values generated with respect to multiple vendors. If a large portion of the vendors have vendor spend analytics values that exceed a threshold, the results analysis module may adjust parameters used in other modules such that generated vendor spend analytics values are lowered. Alternatively, if a large portion of vendors have vendor spend analytics values that fall short of a threshold, the results analysis module may adjust parameters used in other modules such that generated vendor spend analytics values are raised. Parameters that may be changed by the results analysis module include the performance value criteria, performance value sub-criteria, and weighting factors used by the other modules.

Additionally, accounting system 120 may perform electronic commerce or banking functionality based on data received from the quantifying module and/or vendor spend analytics module. Data indicating previous payments made to service providers may be available to results analysis module in memory device and/or via network interface. Payments to service providers may be contingent upon subsequent vendor spend analytics, performance criteria values, and/or performance sub-criteria values, and rules that correlate performance to compensation may be stored in memory device. Accounting system 120 may determine that, based on the compensation rules and the data received from the quantifying module and/or vendor spend analytics module, a debit or credit should be made against the account of a service provider. Accounting system 120 may then initiate an electronic transaction to perform the determined debit or credit. For example, if results analysis module determines that a service provider has exceeded a required vendor spend analytics or service performance criteria or sub-criteria, the results analysis module may initiate the payment of a bonus to the service provider. If the results analysis module determines that a service provider has been overcompensated for work performed, the results analysis module may initiate a debit on the account of the service provider. The results analysis module may initiate the credit or debit via network interface by utilizing a technology such as Electronic Funds Transfer (EFT) or other appropriate service or protocol.

Further, accounting system 120 may analyze data received from the quantifying module and/or vendor spend analytics module based on triggers, and alert users when a triggering event occurs. For example, a trigger may be set based on whether a service provider exceeds a required vendor spend analytics, one or more performance criteria values, or one or more performance sub-criteria values. Alternatively, a trigger may be set based on whether a number of service providers have a required vendor spend analytics, one or more performance criteria values, or one or more performance sub-criteria values. When a trigger condition exists, results analysis module may generate an alert email to send to a user indicating that the trigger condition has been met. Alternatively, accounting system 120 may communicate with display module to generate display data indicating that the trigger condition has been met. A corresponding alert may then be displayed to a user on display device 140. A user may use the alerts, for example, as a basis for renegotiating terms of an SLA with one or more service providers.

Computing system 100 may be implemented, for example, in a computer, System-on-a-Chip, or other computing or data processing device or apparatus. The processor 165 is configurable to execute instructions specifying the functionality of the modules as described above with reference to FIG. 1. The instructions may be stored in memory device 170 and/or in one or more additional computer-readable storage media (not depicted).

Figure 2:
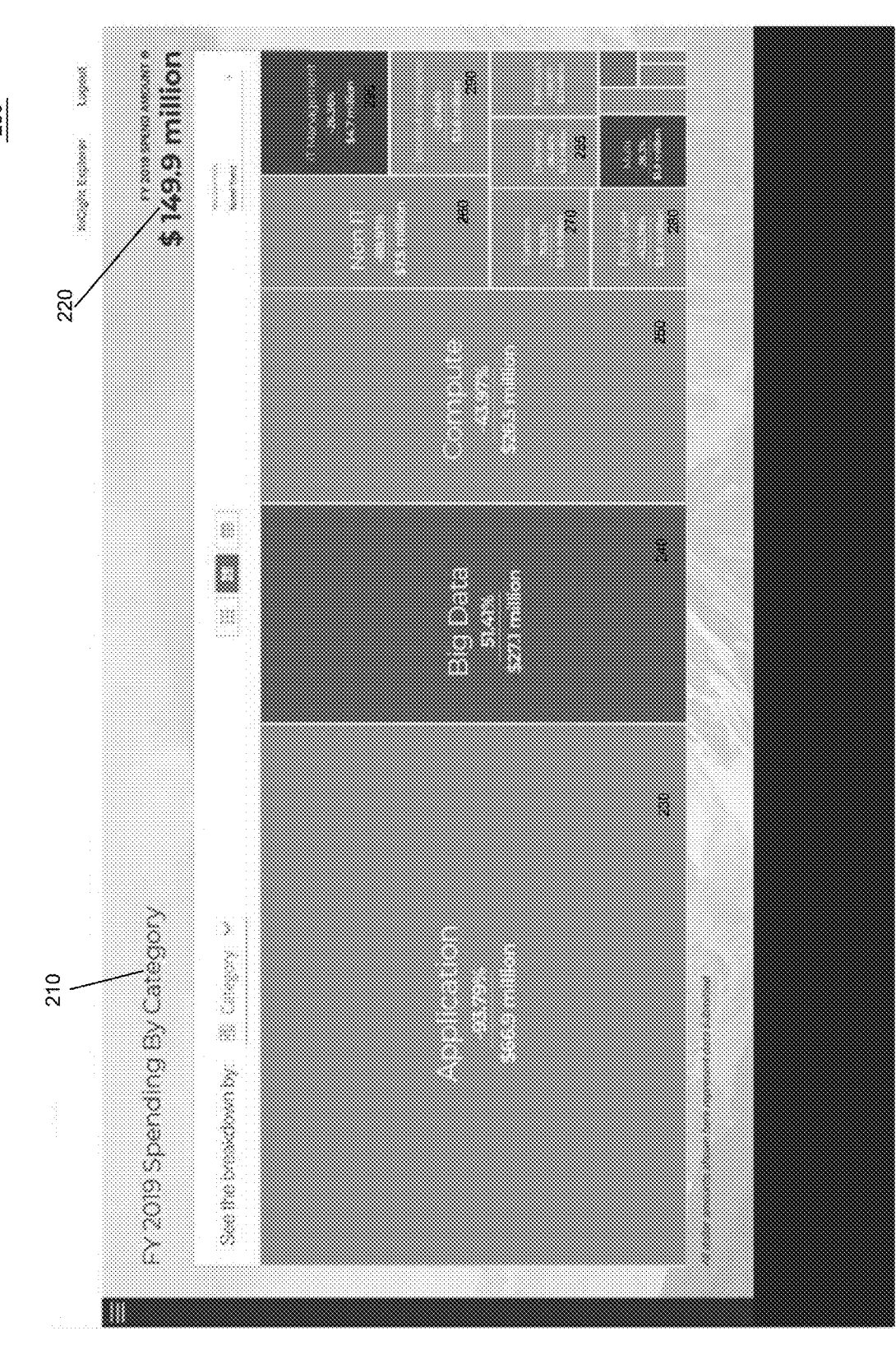
FIG. 2 illustrates an exemplary screenshot of the system of FIG. 1 conveying the vendor spend analytics by providing the spending by category.

FIG. 2 illustrates an exemplary screenshot 200 of the system 100 of FIG. 1 conveying the vendor spend analytics by providing the spending by category 210. In the screenshot 200, the company is illustrated as having spent $149.9 million in fiscal year 2019 220. This spend data is then broken into specific spend categories and depicted using color and size of the display portion to indicate direction and size of the amount spent for each category. As is illustrated in the screenshot 200, application 230 has the largest spend corresponding to the largest box depicted and corresponding to an amount spent of $66.9 million. Big data 240 is the second largest spend, depicted using the second largest box representing an amount spent of $27.1 million. Compute 250 is the third largest spend representing $26.5 million and is sized slightly smaller than the big data representation as a slightly smaller spending is represented. Additional spending is shown for other categories including non-IT 260, platform 270, end user 280, delivery 285, security 290 and IT management 295. Each of the respective boxes is sized according to the amount of spending associated with the category.

By way of example, the entire display may be utilized and represent the entirety of the spending. From there each respective category is sized according the percentage that the category's spending represents as a fraction of the entire spending.

In addition to the size of the represented box, the color of the box may also be used to provide additional information. Such information may include the trend in spending for the category.

Figure 3:
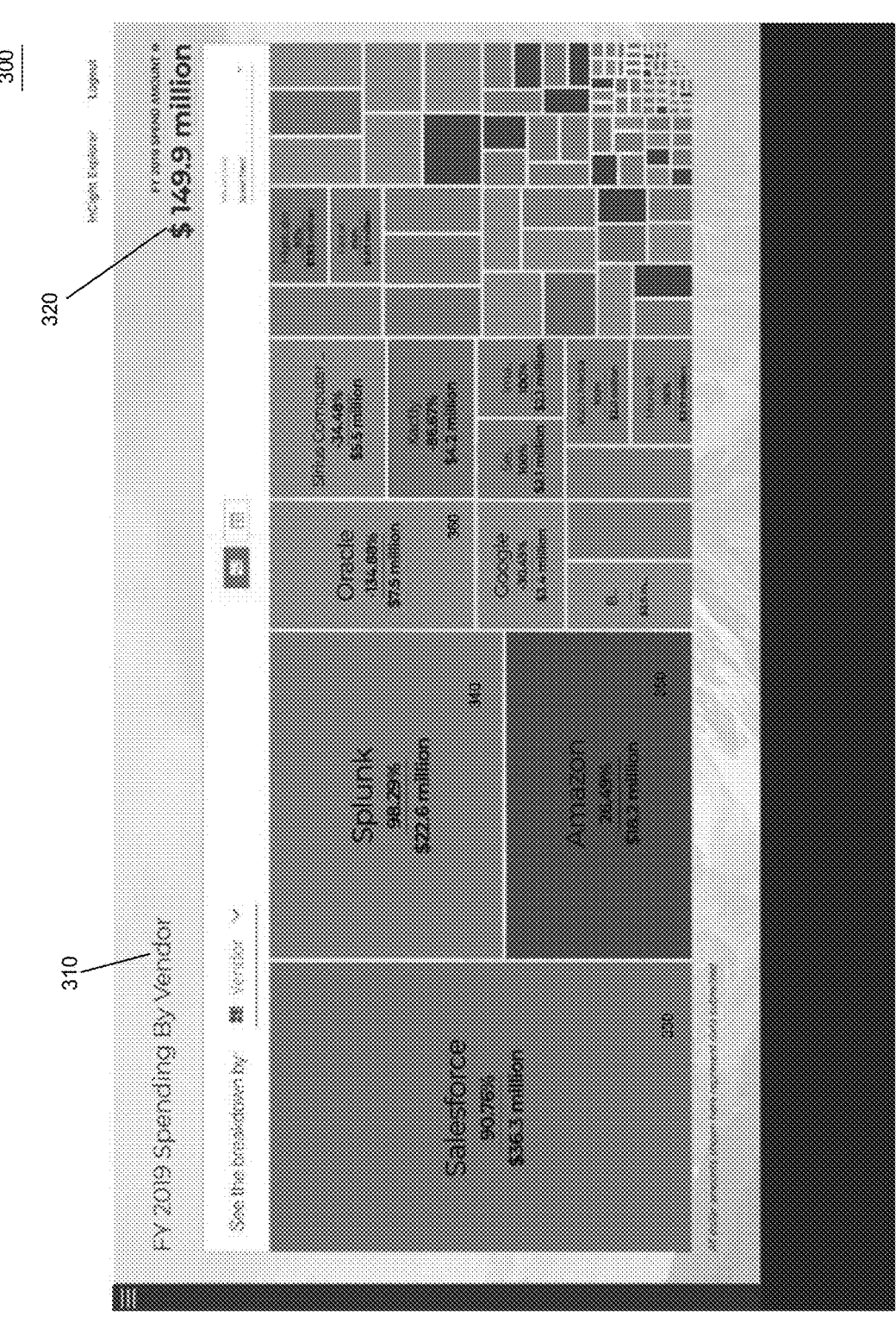
FIG. 3 illustrates an exemplary screenshot of the system of FIG. 1 conveying the vendor spend analytics by providing the spending by vendor.

FIG. 3 illustrates an exemplary screenshot 300 of the system 100 of FIG. 1 conveying the vendor spend analytics by providing the spending by vendor 310. As with that depicted in FIG. 2, in the screenshot 300 of FIG. 3, the company is again illustrated as having spent $149.9 million in fiscal year 2019 320. This spend data is then broken into specific vendors and depicted using color and size of the display portion to indicate direction and size of the amount spent for each vendor. As is illustrated in the screenshot 300, a first vendor 330 has the largest spend corresponding to the largest box depicted and corresponding to an amount spent of $36.3 million. A second vendor 340 is the second largest spend, depicted using the second largest box representing an amount spent of $22.6 million. A third vendor 350 is the third largest spend representing $18.2 million and is sized slightly smaller than the second vendor 340 representation as a slightly smaller spending is represented. Additional spending is shown for other vendors including the fourth 360 through vendor x. Each of the respective boxes is sized according to the amount of spending associated with the vendor.

By way of example, the entire display may be utilized and represent the entirety of the spending. From there each respective vendor is sized according the percentage that the vendor's spending represents as a fraction of the entire spending.

In addition to the size of the represented box, the color of the box may also be used to provide additional information. Such information may include the trend in spending for the vendor.

Figure 4:
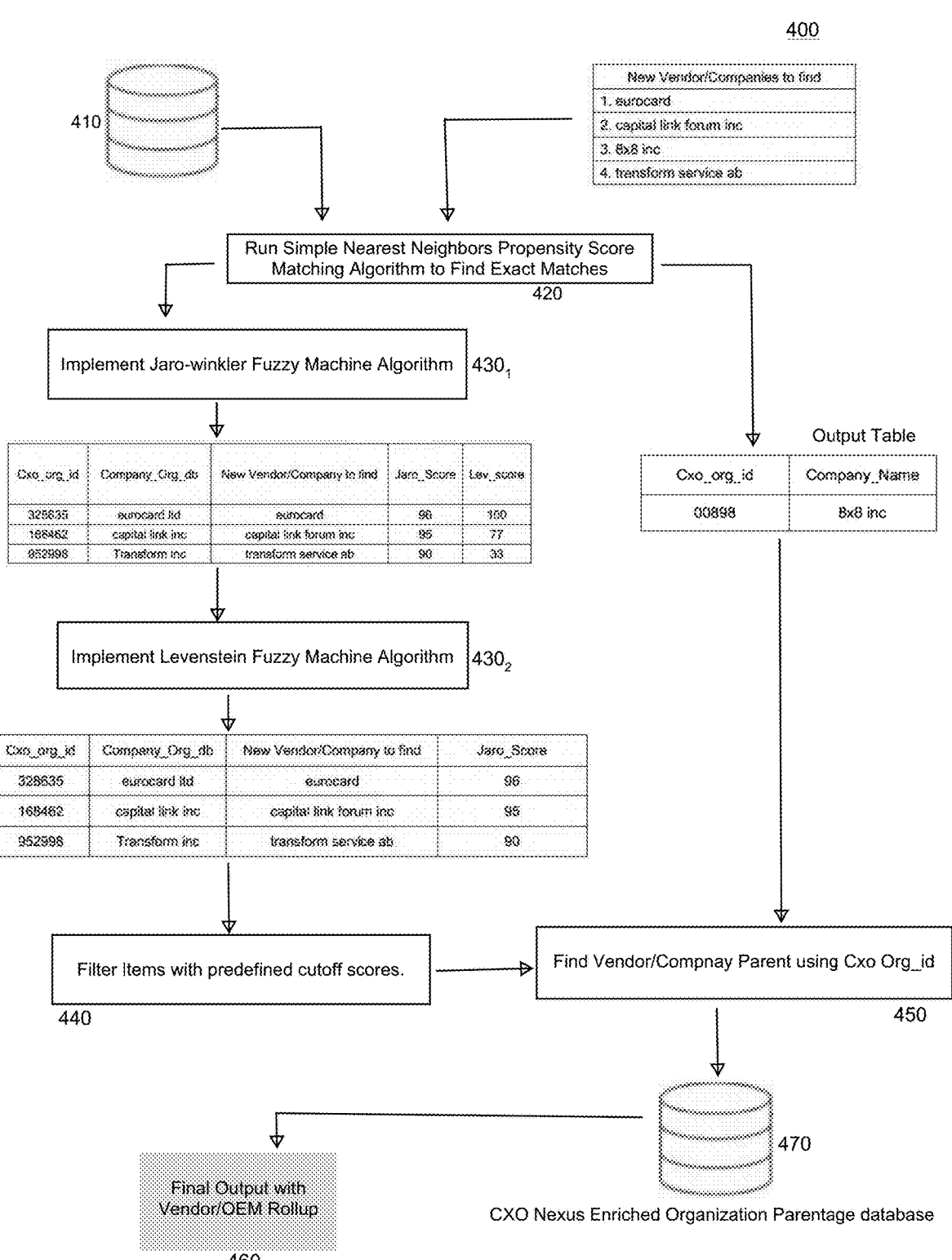
FIG. 4 illustrates a flow of the vendor rollup associated with the present enterprise of FIG. 1.

FIG. 4 illustrates a flow 400 of the vendor rollup associated with the present system 100 of FIG. 1. In the vendor rollup illustrated in FIG. 4, vendor data is extracted from a database 41 of system 100 of FIG. 1. This extracted vendor data allows for the illustration of FIG. 3, which shows users, such CIOs, CMOs, CFOs, and the like, how much the company is spending collectively with multiple vendors who have been rolled up into a single, acquiring company, such as through merger and acquisition activity, for example. Vendor rollup may also be referred to as parentage.

In the vendor rollup, the manufacturer of the purchased item is all identified in an OEM reveal, further allowing a linking of the OEM owner. In an automated, real-time or near real-time fashion, the purchasing company may be alerted that some of the vendors have been acquired by another company. This feature additionally allows for alerting regarding potential redundancies, waste and poor deal negotiation.

For example, a large financial institution is spending annually $30M with VMWare, $5M with Pivotal, $25M with EMC and $20M with Dell. The purchasing agents within the procurement department of the company are likely unaware that Dell acquired VMWare, Pivotal and EMC. So rather than negotiating each contract as a stand-alone negotiation at the smaller amounts, the large financial institution may see that a collective spend amount of $70M with Dell which is an amount much greater than the individual amounts. This higher spend amount may provide insight to negotiate better pricing in negotiations with each of the commonly owned vendors. A significant savings may be achieved and may reach the tens of millions of dollars.

Identifying the actual company requires normalization of the supplier name and the OEM company name 420. The method of FIG. 4 shortens a company's name allowing acronyms, synonyms, doing business as (DBA), or also known as (AKA) to be captured. Further refinement in the method may account for the same company just located in different states or countries. Further, the name may be stemmed in part or in whole to produce a normalized name. This normalized name is kept in in the database of FIG. 1 and associated with the proper company to be reused.

Further, multistep fuzzy match algorithms $430_1$, $430_2$ are utilized to further perform normalization. The algorithms utilize statistically tested cutoff scores to deliver accurate match results. FIG. 4 illustrates a detailed diagram of the process flow.

Specifically, FIG. 4 illustrates the organization database of FIG. 1 providing input along with new companies and vendors to find to a first step of identifying nearest neighbors with propensity score matching algorithm to find exact matches 420. The output of this test is provided to an algorithm that determines the vendor or company parent company 450. The algorithm also outputs the exact matches to a second algorithm that uses the fuzzy matching $430_1$, $430_2$ described herein above. The output of the fuzzy matching $430_1$ is provided to a second fuzzy matching algorithm $430_2$ and then items with predefined cutoff scores 440 are filtered. These values are then input to the algorithm that determines the vendor or company parent company 450. The result is then fed back into the organization database 470 and output a final data set 460 for vendor OEM rollup.

The system intelligently determines and reveals the parent-child relationship of vendors that occurs as a result of mergers and acquisitions. This solution reveals important relationship data in a shorter period of time than any existing process or solution as current approaches fail in the normalization of the company name. This failure leads to inaccurate association if at all. The system enhances the parentage to include all known prior parent entities and the date on which the parentage changed allowing for the ability to analyze spend relative to specific times. This is especially important when we consider benchmarks and trends.

In a similar manner to that described above with respect to FIG. 4, using accounts payable, invoice and purchase order data, the company's pending with vendors at the OEM and vendor parent level is determined. Using artificial intelligence and machine learning on the vendor taxonomies, the original OEM is determined regardless of who the goods or services were purchased from or whether the customer's data includes OEM data. The combination of artificial intelligence and machine learning generates "reseller spend visibility." This visibility reveals and visualizes how much a company is actually spending on the original equipment manufacturer ("OEM"), which in most systems is not known due to the multiple and myriad resellers that are purchased from or through.

For example, a company is spending more than $2M/month ($24M/year) on Cisco equipment, but nothing in their financial records reveals that, because purchase requests, purchase orders and invoices show that the Cisco equipment was purchased through dozens of VARs and resellers. Large organizations are able to negotiate better terms by presenting where a vendor resides in the company's vendor list. In the example, if Cisco is one of their Top 5 vendors, for example, leverage based on this relationship may be applied. Existing financial systems do not reveal such information when the OEM requires that organizations purchase their equipment through VARs or resellers.

The present system preforms the vendor aggregation similar to that described above. This occurs at the OEM level as well as consolidating "non-OEM" vendor spend. The need for vendor aggregation arises from multiple vendor instances in source data (inconsistent client vendor tables) and company subsidiary relationships that exist external to source data. The money spent may be categorized to standardized technology business management categories to promote transparency to illustrate how money paid to vendors is deployed/used within an organization.

A core OEM hierarchy table in a database of FIG. 1 is established. The table links to itself to form parent-child hierarchies. Spend data from customers is ingested and matched against the supplier name (vendor of purchase record), OEM name, manufacturing part numbers, model numbers and potential nomenclature that the machine learning operates that could be specific to a client's data. This approach uses augmented NLP to process the spend description. The result of the spend description may then be passed to a Deep Learning model that includes an inference engine with heuristics to provides speed and scale. Further, a Linear Support Vector Machine and Random Forest process the final output. The final output 460 is used to determine if the incoming OEM name is a match of an existing OEM name. If the system 100 does not have enough confidence of a match, a combination of the purchase data and incoming OEM name are run through a neural network. If there is still not a high enough confidence of a match, the incoming OEM name is given to a human curator for analysis. The human curator attempts match to an existing OEM name or indicate that this is a new OEM. The system creates the new OEM if needed. If the human or neural network indicated a match, the incoming OEM name is added as an alias name for the existing OEM so subsequent human curation is no longer needed. Once spend data is analyzed and matched, amount spent can be aggregated by parent OEM appropriate to OEM ownership hierarchy at the time of spend.

The OEM hierarchy table is kept up-to-date by a combination of human curation as well as automated ingestion of organizational hierarchy data from companies such as LexisNexis, Dun & Bradstreet, Moody's, and open ownership.

The OEM hierarchy is also tracked by date period as corporate ownership of entities changes over time.

Most companies fail to accurately report Vendor & OEM spend because accounts payable and PO systems are not designed to report on this level of specificity, manual data entry when creating a purchase order is often unstructured, such as product information, and financial reporting systems ted to focus on fiscal reporting. Accounts payable systems do not necessarily take in detailed line items as a part of the payment record with respect to product information. Typically, financial reporting systems do not include vendor detail on expenditures that are capitalized and processed through fixed asset systems. Financial systems reporting also may aggregate data on a general ledger account basis generally does not keep records with sufficient vendor detail to provide accurate vendor reporting. The present system 10 intelligently determines the OEM through a combination of techniques to achieve a much higher match rate in a shorter period of time than any existing process or solution.

Accurate vendor spend aggregation is an enormous task. In large companies, vendors are often duplicated in accounts payable and purchase order systems due to: multiple remit to addresses, regional instances of a given vendor around the world, user bias, such as inconsistent utilization of abbreviations in entering vendor names, for example and general inconsistent vendor tables maintenance. The present system normalizes and cleans inconsistent vendor names by "compressing a name." For example, in an accounts payable vendor table of FIG. 1, IBM can show up in multiple ways. These may include IBM, I.B.M., International Business Machine, International Business Machine S.A, for example. Training the system to recognize each name as the same organization is fundamental to performing efficient an accurate vendor aggregation.

When a transaction is processed the first item to be resolved is the name of the supplier and the name of the manufacturer. These may vary in spelling accuracy, pseudonym usage and truncation. Dell, Dell Technologies, Inc., Dell Corp ltd, for example, should all point back to Dell. HP and Hewitt Packard are the same while HPS is different, for example. The present system 100 matches an incoming vendor name with an existing hierarchy by interpreting and normalizing the different variations of company names. Further, the present system 100 simplifies the data set through a visualization engine.

Figure 5:
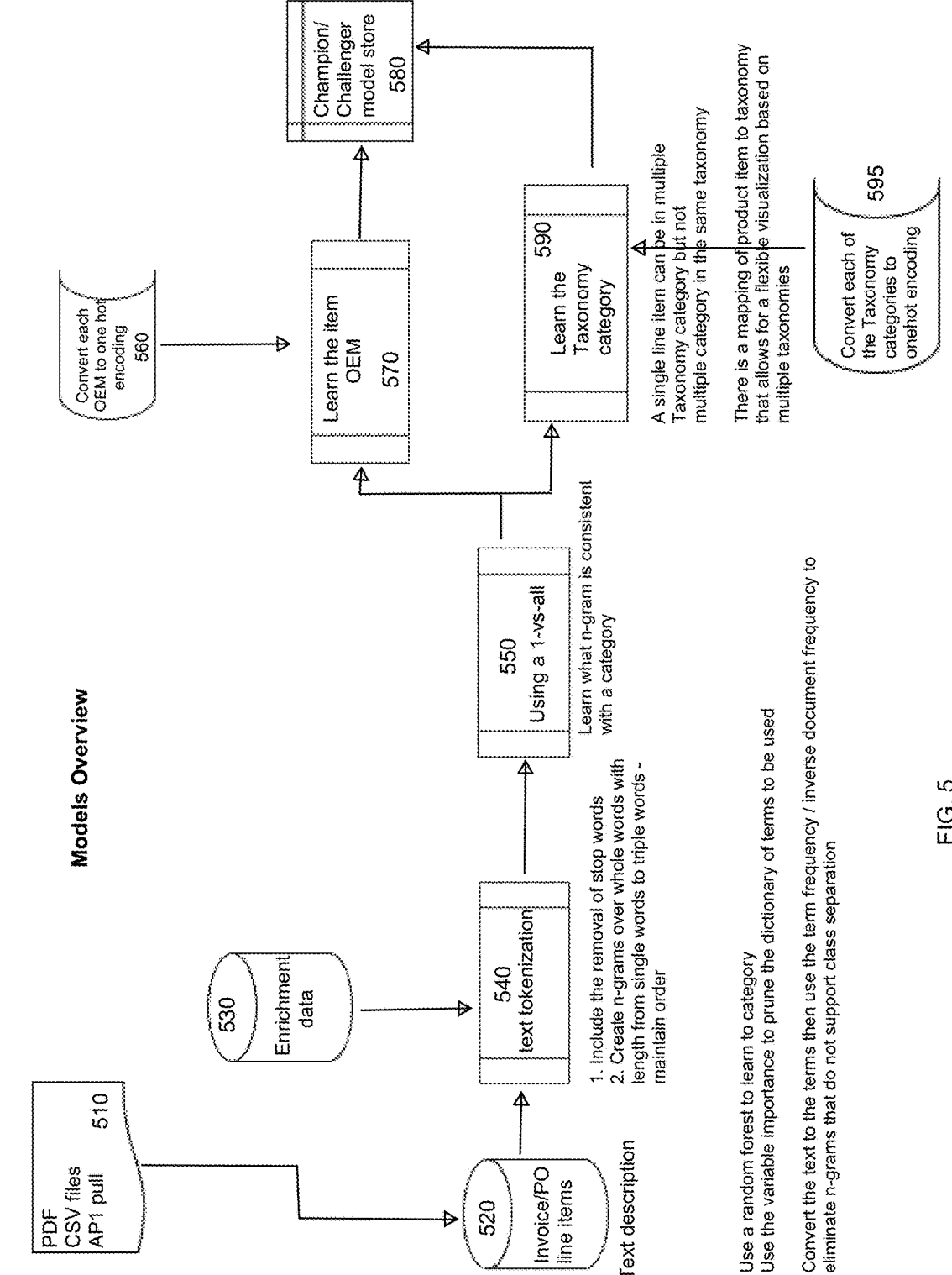
FIG. 5 illustrates a flow for finding the OEM from a product in the database of FIG. 1.

FIG. 5 illustrates a flow 500 for finding the OEM from a product in the database of FIG. 1. The item description is used to train a model to recognize the words to categorize the OEM. Manufacturing companies use verbiage that is tailored to differentiate their product. This verbiage is not always captured at the purchase order line item level, but often at the invoice line item level. In topic modeling, the concept of word vectors may be used to find topics of interest and is used in the present system to find the OEM from product descriptions. This approach requires a large corpus of data from an OEM to converge with high confidence.

The flow 500 implemented takes an incremental approach to learning the OEM. The OEMs are examined and the model is updated to improve the next iteration of training.

The flow 500 may further leverage online learning by forming a solid base on which to incrementally improve and allow for the fact that over time the words that describe a category may change. Take each word as a random variable, and the conjunction of multiple to be the conditional probability that it is the OEM given those words. The feature set, the words used can change over time. This feature set is then defined in Eq. 1 using:

$$X \sim N(\mu, \Sigma) = \exp\left(-1/2(X - \mu)^{\wedge}T\Sigma^{\wedge}(-1)(X - \mu)\right)/\sqrt{((2\pi)^{\wedge}k|\Sigma|)}, \quad \text{Eq. 1}$$

where sigma is the covariance. For speed and ease, each of the variables, words, are considered independent and use the product of the probabilities:

For example, in Eqs. 2, assuming the category or the OEM is C then what is the probability that the current description with features $x_1$, $x_2$, . . . , $x_n$ indicate that the item is in the right category.

$$P(C \mid x_1, x_2, \dots, x_n) = P(x_1, x_2, \dots, x_n \mid C)P(C), \quad \text{Eqs. 2}$$

$$\dots$$

$$P(x_1, x_2, \dots, x_n)$$

$$P(x_1, x_2, \dots, x_n \mid C)P(C) =$$

$$P(x_1, x_2, \dots, x_n, C)\_P(x_1 \mid C)P(x_2 \mid C) \dots P(x_{n-1} \mid C)P(C) -$$

under the Naive assumption of independence $$P(C \mid x_1, x_2, \dots, x_n) = P(x_1 \mid C).P(x_2 \mid C) \dots P(x_n \mid C)P(C)$$

This formulation allows the right features to be selected from the text processing and text repository. Each category may be provided its own distribution of words and a band around center for class assignment. The category with the highest probability wins. X is the vector of words being used to classify the item into an OEM category. Y is the OEM category label. As more of the words associated with the category of determined, the probabilities of the category improve. As certain words change the model automatically adjusts by updating the probabilities from the latest sample.

While other entities use catalogs of products manufactured by OEMs, the present system uses a combination of artificial intelligence and machine learning along with purchase item data, reseller info, and spend categorization to determine the OEM based on just a product description. Further, the present system differentiates the use of product-level information with a visualization engine.

Specifically, FIG. 5 illustrates a flow where data is input in the form of PDF, CSV or another file format at step 510. A text description of the invoice PO line item at step 520 is determined. A random forest method may be used to learn the category and use variable importance to prune the dictionary of terms to be sed. Further, the system may convert the text to terms then use term frequency and inverse document frequency to eliminate n-grams that do not support class separation at step 530.

From the text description, a tolerance may be performed at step 540. This may include the removal of stop words and create n-grams over whole words with length from single words to triple words to maintain order. Enrichment data at step 530 may be further fed into the tolerance.

The system may learn what n-gram is consistent with a category at step 550. From there the OEM may be learned at step 570 and the taxonomy category may be learned at step 590 to identify the OEM from the description.

In addition to providing transparency on "who" a company is spending money with, an equally important data point is providing transparency on "what" a company is purchasing. Using a pre-defined and recognized taxonomy combined with the ability to view the data set via the taxonomy allows the system to provide standardized context to spend aggregation. The standardized taxonomy allows for analysis such as benchmarks and anonymized peer to peer comparisons. Custom taxonomies via a customer portal may be configured to allow customers the ability to create additional views of data.

It is standard for companies to define a set number of levels to their taxonomy and render it as a single row in a database. The present system allows any number of levels to accommodate all clients and provide maximum flexibility. This system may be used to encompass both IT and non-IT spend.

Set taxonomies may be defined initially. Then the model must learn to automatically categorize a spend line item into the appropriate category. This automatic classification is accomplished using a hybrid model combining a Support Vector Machine (SVM), a Random Forest (RF), a neural network (NN), and an expert system (ES). The random forest may be used to detect n-grams that are correlated with a category. This process drops the number of variables from 6,000 to between 200 and 500. These variables may be used to build the SVM and NN. For the SVM and NN, the results are calibrated to indicate the probability that an item really belongs in a class. This probability is used to determine what items need to be reviewed by a person for proper class assignment. Use of both an SVM and a NN is akin to using two experts to check for expert agreement to confirm that an item belongs in a certain class. When the methods produce discrepant results, depending on the confidence of the methods, and the difference between their confidences, a class is selected for the item or it is sent to a person for review.

The expert system, ES, is for those items with good inference rules to determine a correct class label. This is a preliminary process until there is enough volume for the SVM, RF, and NN to learn the category and do the automated classification. The RF is expensive in execution time but very consistent with how a human expert would reason to determine a class label.

This approach utilizes both the hybrid approach and the way in which the data is prepared learning to succeed in the taxonomy. The trade off to the expert system rules to capture the inference rules from the human expert and feed the results to the engine to train on is vital. The volume of data initially is not large and requires a means to get good labeled data. The expert system provides this bridge.

Figure 6:
FIG. 6 illustrates a screen depiction of the enterprise system of FIG. 1 illustrating the navigation windows for selecting vendor true spend, peer comparison, market insight and prescriptive insight aspects.

FIG. 6 illustrates a screen depiction 600 of the enterprise system 100 of FIG. 1 illustrating the navigation windows for selecting vendor true spend 610, peer comparison 620, market insight 630 and prescriptive insight aspects 640. This screen may be used to create and leverage aggregated data from the databases of FIG. 1. By selecting the true spend navigation radial button, the system activates the true spend analysis.

Figure 7:
FIG. 7 illustrates a screen depiction of the enterprise system of FIG. 1 illustrating the landing page in the category spend described herein.

FIG. 7 illustrates a screen depiction 700 of the enterprise system 100 of FIG. 1 illustrating the landing page in the category spend 610 described herein above. This uses the taxonomy that is defined above in FIG. 2 including application 230, big data 240, compute 250, platform 270, end user 280, delivery 285, security and compliance 290, IT management 295, and non-IT (not shown). The presented IT pattern is proved and, in this instance, a one year spend 710 is provided. Each of the variables may be modified to change the presentation using either other colors for trending, or other timeframes to view, for example.

Figure 8:
FIGS. 8 and 9 illustrate a screen depiction of the enterprise system of FIG. 1 illustrating the vendor spend after selection of the vendor spend in the window of FIG. 7.
Figure 9:
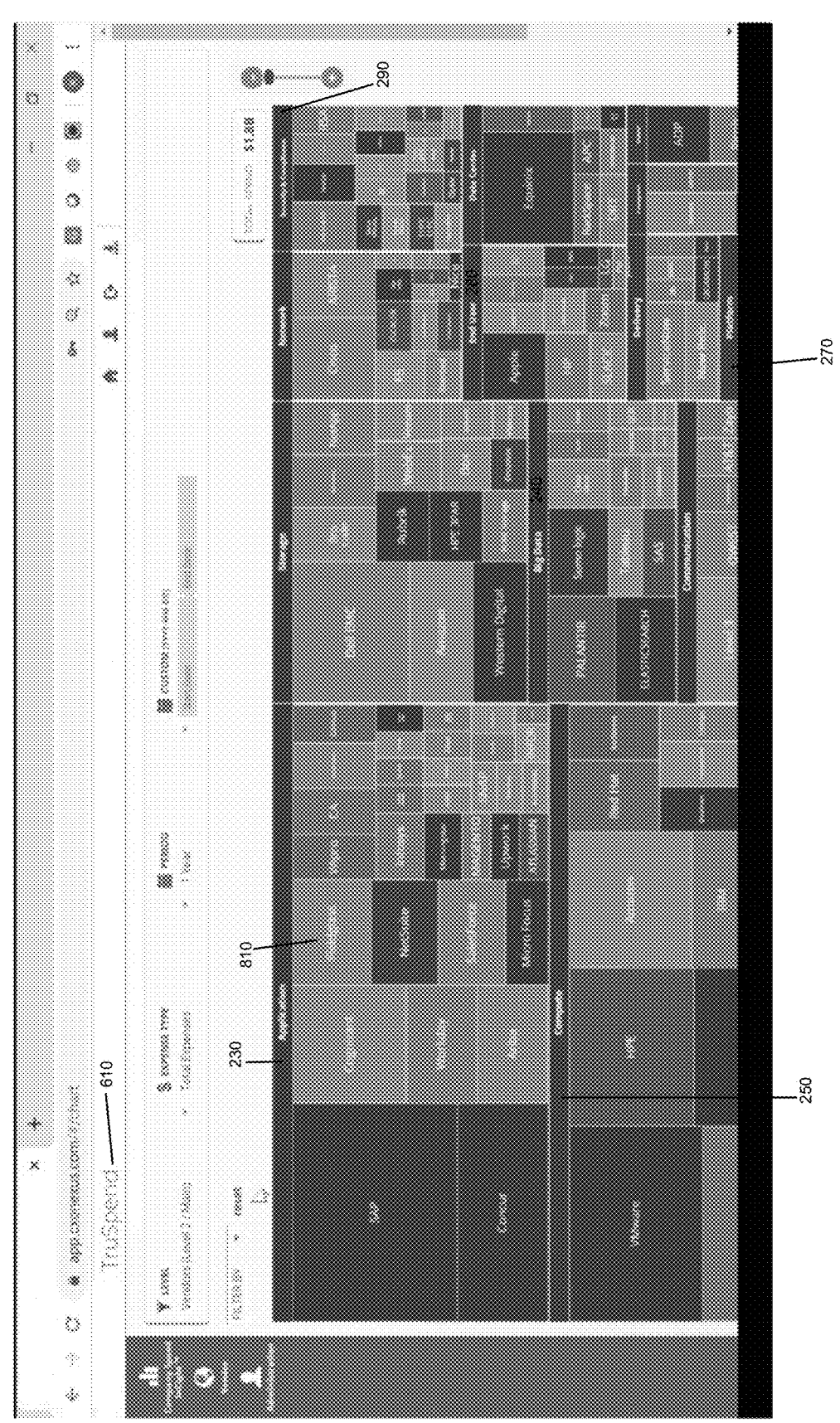

FIGS. 8 and 9 illustrate a screen depiction 800 of the enterprise system 100 of FIG. 1 illustrating the vendor spend after selection of the vendor spend 610 in the window 700 of FIG. 7. FIG. 8 represents screen depiction 800 partially transformed from screen 700 of FIG. 7 and FIG. 9 represents screen depiction 800 more fully transformed from screen 700 of FIG. 7. Screen depiction 800 provides spend data based on vendor within the taxonomy of FIG. 2 again by including application 230, big data 240, compute 250, platform 270, end user 280, delivery 285, security and compliance 290, IT management 295, and non-IT (not shown) represented in FIG. 7. Specifically, each vendor box size 810 is allocated based on the spend level within the taxonomy. Colors such as red and green may be used to indicate increased spending (red) and decreased spending (green), while using shading of the respective colors to indicate degree of increase or decrease. The identified vendor may additionally account for resellers that may be involved in the chain. As may be evident in comparing the depictions in FIG. 8 and FIG. 9, the vendor box has replaced the spend values depicted in FIG. 7. Each of the vendors that make up a portion of the taxonomy of FIG. 2 is represented with the size, and color providing underlying meaning within the data as described herein.

Figure 10:
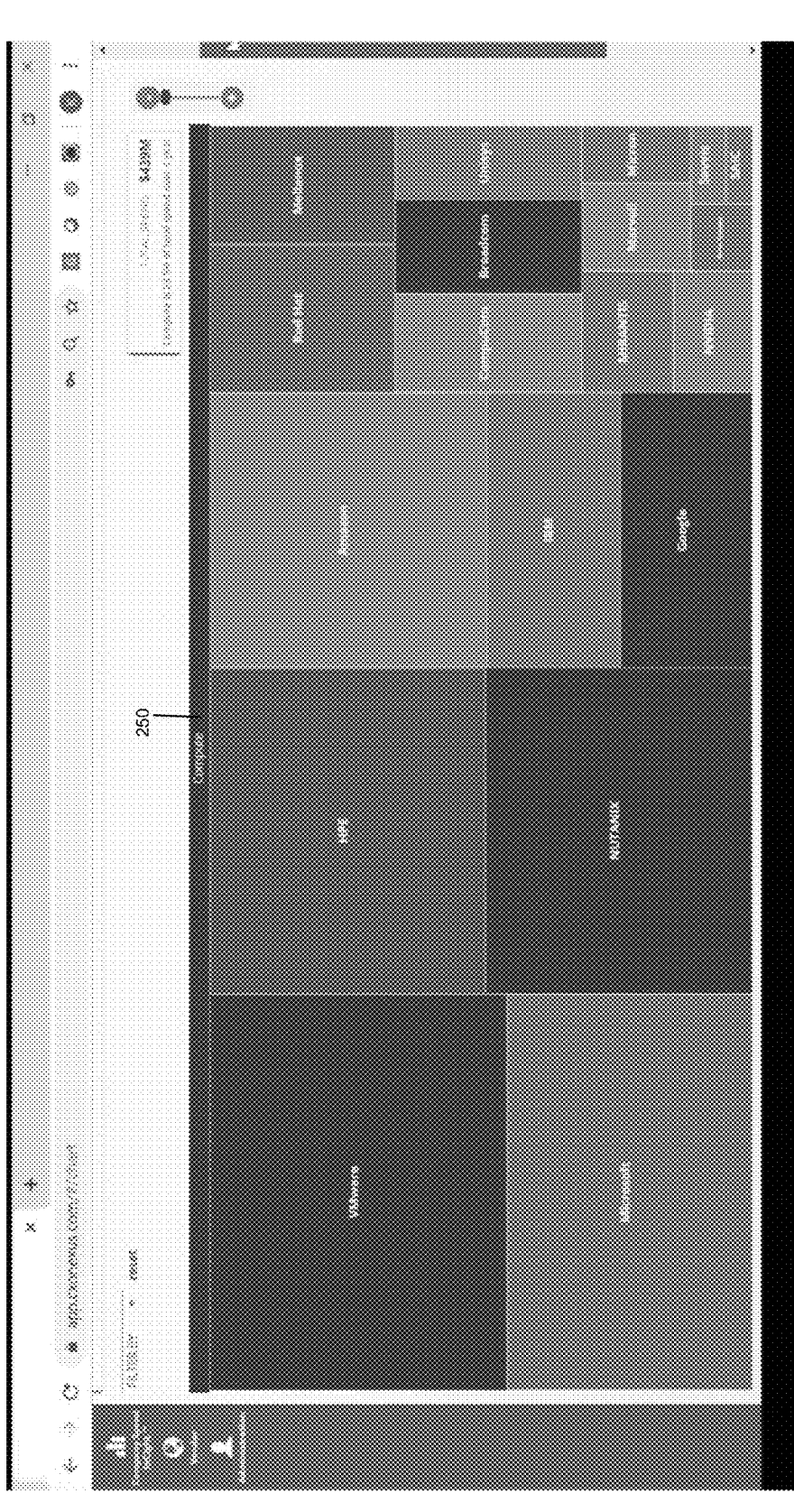
FIG. 10 illustrates a screen depiction of the enterprise system of FIG. 1 illustrating the vendor spend for a specific category selected in FIG. 7 or FIGS. 8 and 9.

FIG. 10 illustrates a screen depiction 1000 of the enterprise system 100 of FIG. 1 illustrating the vendor spend for a specific category selected in FIG. 7 or FIGS. 8 and 9. In this depiction, a portion of the taxonomy of compute 250 is selected and illustrated. Screen depiction 1000 provides the vendor spend for the selected compute 250. As may be evident by comparing with FIG. 9, for example, this enlarges the views of the Compute taxonomy 250 and the underlying vendors associated in the compute 250 category. Screen depiction 1000 highlights details on vendor consolidation benefits that may be achieved.

Figure 11:
FIG. 11 illustrates a screen depiction of the enterprise system of FIG. 1 illustrating additional detail provided by selecting a specific vendor in the depiction of FIG. 10.

FIG. 11 illustrates a screen depiction 1100 of the enterprise system 100 of FIG. 1 illustrating additional detail from FIG. 10 and the selection of the exemplary compute 250 taxonomy and further provides detail by selecting a specific vendor 1110 in the depiction of FIG. 10. By selecting VMware 1110, for example, additional details are provide relating to the top spenders, identified by name, in the company in this category and how much the total spend is in the category. Such information may provide point people within the company with respect to a given vendor.

Figure 12:
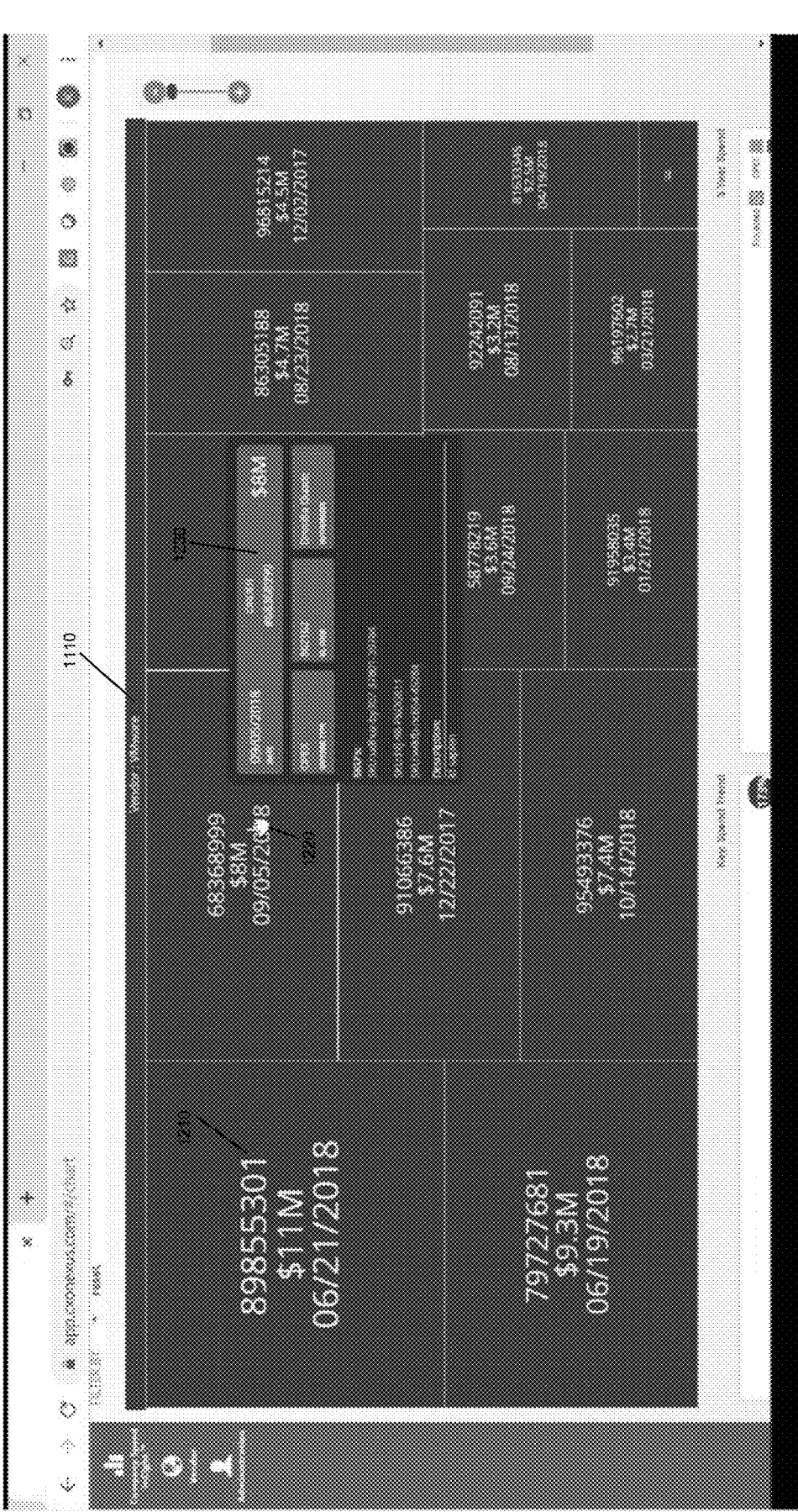
FIG. 12 illustrates a screen depiction of the enterprise system of FIG. 1 illustrating additional detail provided by selecting a vendor identified in the category of FIG. 10.

FIG. 12 illustrates a screen depiction 1200 of the enterprise system 100 of FIG. 1 illustrating additional detail provided by selecting a vendor 1110 identified in the category 250 of FIG. 10. This allows specific orders 1210 within the category 250 and vendor 1110 to be viewed. Additionally, by interacting with the screen 1220 a user may even be provided with additional information regarding a particular order 1230, such as order number, date, cost, product and the like.

Figure 13:
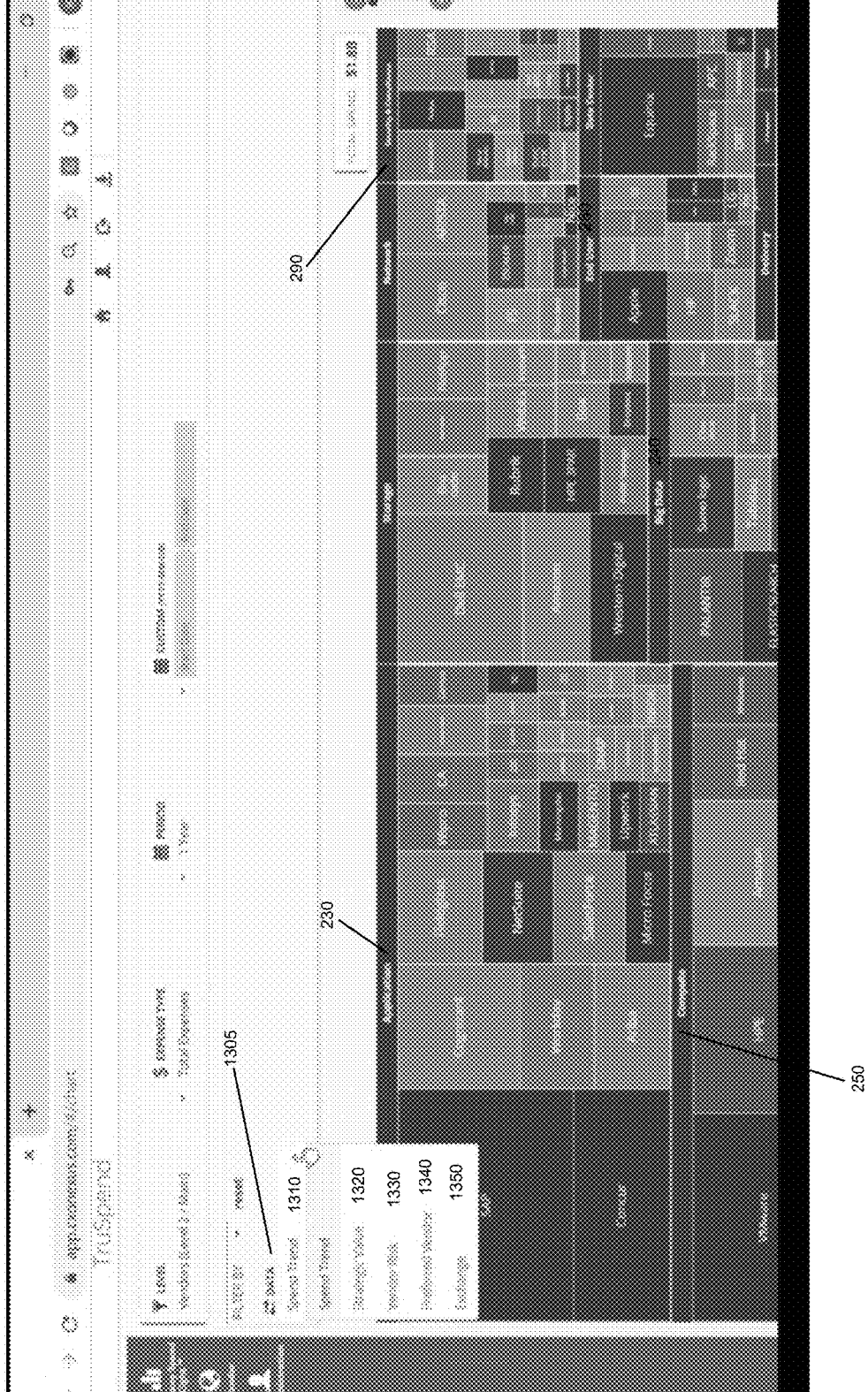
FIGS. 13 and 14 illustrate a screen depiction of the enterprise system of FIG. 1 illustrating a user selectable toggle allowing the depiction to indicate pend trends, strategic value, vendor risk, preferred vendor and exchange.
Figure 14:
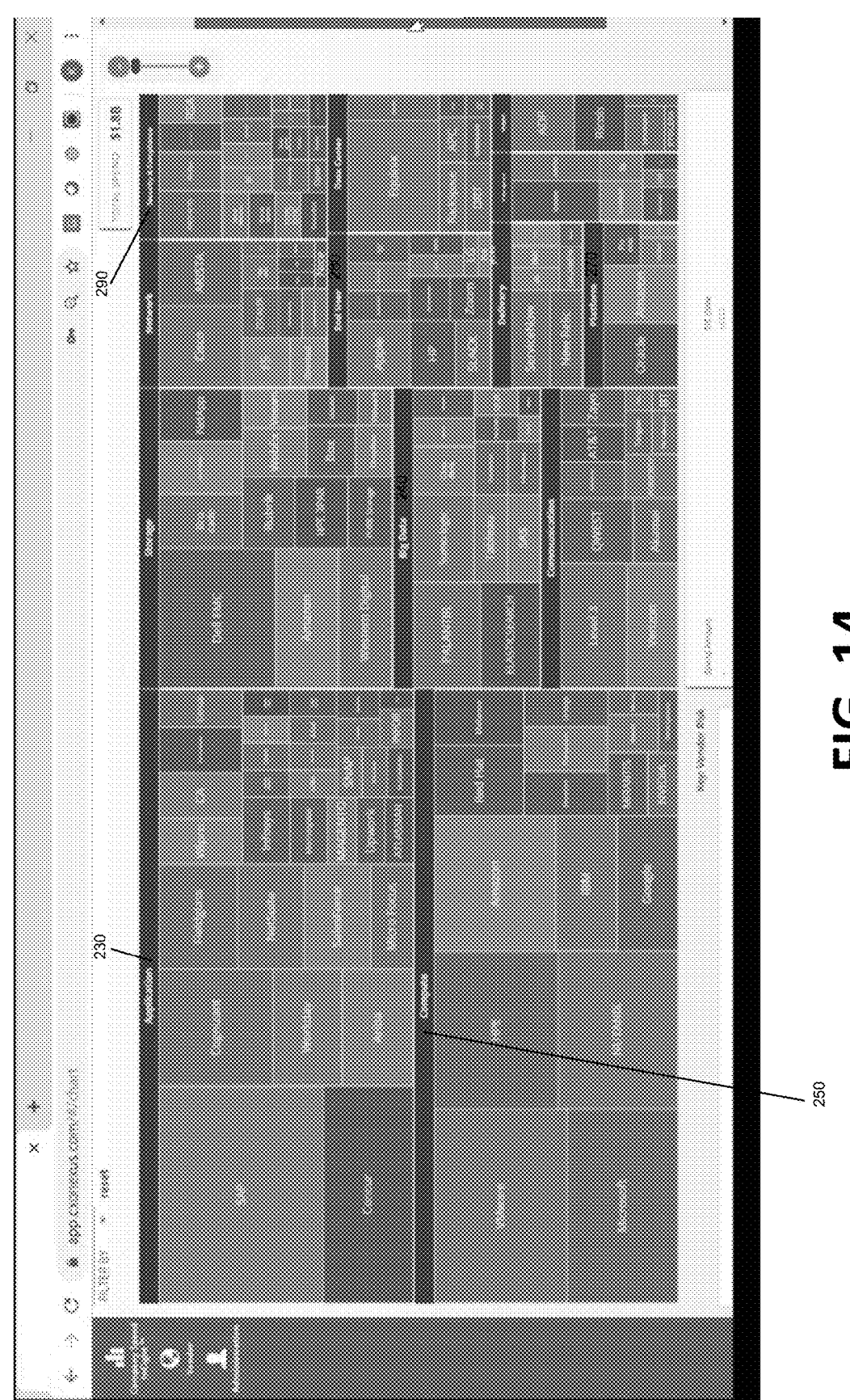

FIGS. 13 and 14 illustrate a screen depiction 1300 of the enterprise system 100 of FIG. 1 illustrating a user selectable toggle 1305 allowing the depiction to indicate spend trends 1310, strategic value 1320, vendor risk 1330, preferred vendor 1340 and exchange 1350. Toggle 1305 allows other metadata to be selected and provided to a user. This system of visualization may provide output depictions of any other metadata found within the system 100. For example, risk for vendors 1330, within the taxonomy of FIG. 2 again by including application 230, big data 240, compute 250, platform 270, end user 280, delivery 285, security and compliance 290, IT management 295, and non-IT (not shown) represented in FIG. 7, may be displayed and color coded for this additional toggled 1305 metadata.

Figure 15:
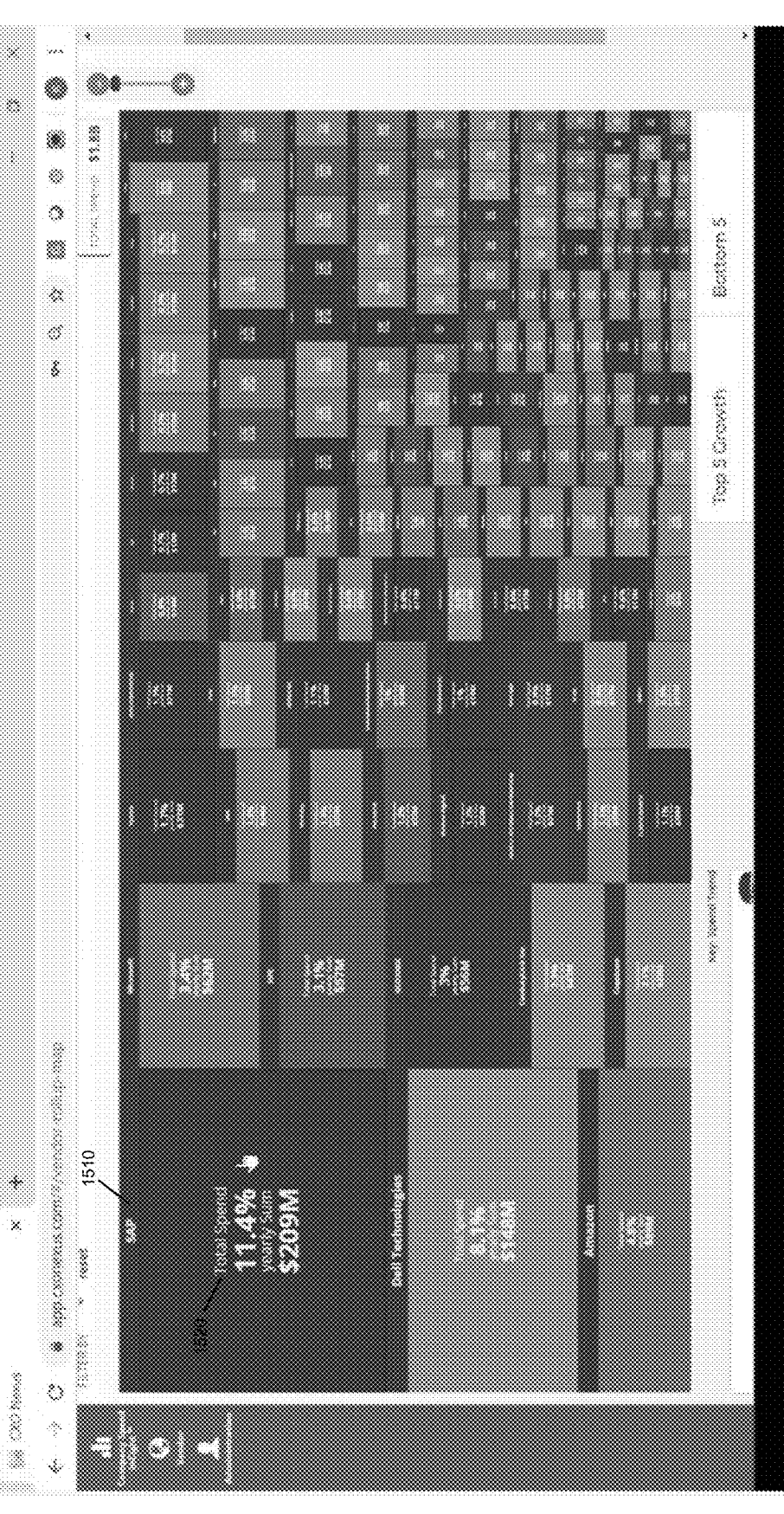
FIG. 15 illustrates a screen depiction of the enterprise system of FIG. 1 illustrating depicting the true spend of a particular vendor regardless of category.

FIG. 15 illustrates a screen depiction 1500 of the enterprise system 100 of FIG. 1 illustrating the true spend 1520 of a particular vendor 1510 regardless of category. As depicted, each vendor 1510 is identified and presented based on amount of spend 1520 represented via size of the box, with trending direction represented via the color coding while accounting for underlying related entities as described herein.

Figure 16:
FIG. 16 illustrates a screen depiction of the enterprise system of FIG. 1 illustrating depicting a dive into a particular vendor true spend.

FIG. 16 illustrates a screen depiction 1600 of the enterprise system 100 of FIG. 1 illustrating depicting a dive into a particular vendor 1610 true spend. This illustrates the subsidiary spending that occurs for the company with the vendor.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement the systems and methods described herein.

What is claimed is:

1. An intelligent enterprise system in a company, said system comprising:
   an input/output (IO) interface configured to receive information related to accounting information;
   a processor interconnected with a memory configured to store received information from the IO interface, perform a matching algorithm to find matching vendors within the information and analyze the information to provide timely vendor spend analytics, the timely vendor spend analytics configured from the spending records of the company and identifying a plurality of spend categories with associated direction and size of the spend per category; and
   a display device configured to display the provided timely vendor spend analytics.

2. The system of claim 1, wherein the received information includes spending by category.

3. The system of claim 1, wherein the received information includes spending by vendor.

4. The system of claim 1, wherein the received information includes spending over a time period.

5. The system of claim 4, wherein the time period is a selected fiscal year.

6. The system of claim 1, wherein performing the matching algorithm includes using nearest neighbor's propensity scoring to find exact matches.

7. The system of claim 1, wherein performing the matching algorithm includes fuzzy matching algorithm to identify matches.

8. The system of claim 1, wherein performing the matching algorithm includes at least two fuzzy matching algorithms to identify matches.

9. The system of claim 1, wherein the matching is based on a cutoff score.

10. The system of claim 1, wherein parent company information is identified for at least one vendor.

11. The system of claim 1, wherein a textual tokenization is performed.

12. The system of claim 1, wherein an OEM is learned based on the received information.

13. The system of claim 1, wherein a taxonomy category is determined based on the received information.

14. The system of claim 13, wherein at least one of a hybrid model combining a Support Vector Machine (SVM), a Random Forest (RF), a neural network (NN), and an expert system (ES) is utilized.

15. The system of claim 1, wherein the display device is configured to select vendor true spend, peer comparison, market insight and prescriptive insight aspects.

16. A method to provide vendor spend analytics in a company, said method comprising:

receiving information related to accounting information via an input/output (IO) interface;

storing the received information via a processor interconnected with a memory;

performing a matching algorithm to find matching vendors with the information;

analyzing the information to provide timely vendor spend analytics, the timely vendor spend analytics configured from the spending records of the company and identifying a plurality of spend categories with associated direction and size of the spend per category; and displaying via a display device the provided timely vendor spend analytics.

17. The method of claim 16, wherein the received information includes at least one of spending by category and spending by vendor.

18. The method of claim 16, wherein the matching algorithm includes at least one of processing by the processor using nearest neighbor's propensity scoring to find exact matches and processing by the processor using fuzzy matching algorithm to identify matches.

19. The method of claim 16, wherein an OEM is learned based on the received information and a taxonomy category is determined based on the received information.

20. The method of claim 16, wherein at least one of a hybrid model combining a Support Vector Machine (SVM), a Random Forest (RF), a neural network (NN), and an expert system (ES) is utilized in the analyzing.

\* \* \* \* \*